April 8, 1941.  J. P. LAWLOR ET AL  2,237,882
REMOVING IRON FROM WATER
Filed Dec. 6, 1937

Inventors:
Joseph P. Lawlor
Vincent M. Roach
By Chritton, Wiles, Davies, Kirschl & Dawson
Att'ys Patented Apr. 8, 1941

2,237,882

UNITED STATES PATENT OFFICE 2,237,882

REMOVING IRON FROM WATER

Joseph P. Lawlor and Vincent M. Roach, Ames, Iowa, assignors to General Filter Company, Ames, Iowa, a corporation of Iowa Application December 6, 1937, Serial No. 178,396

11 Claims. (Cl. 210—26)

This invention relates to removing iron from water, together with other compounds, gases, and odors.

An object of the invention is to provide a simple and effective method and means for removing iron from well water and other water, together with other undesirable solids and gases. A further object is to provide a simple method and means for rendering iron compounds insoluble through the use of air and removing the compounds through filtration, while at the same time preventing and substantially reducing the absorption into the water of certain constituents of the air. Other specific objects and advantages will appear as the specification proceeds.

The invention is illustrated, in a preferred embodiment, by the accompanying drawing, in which—

Figure 1:
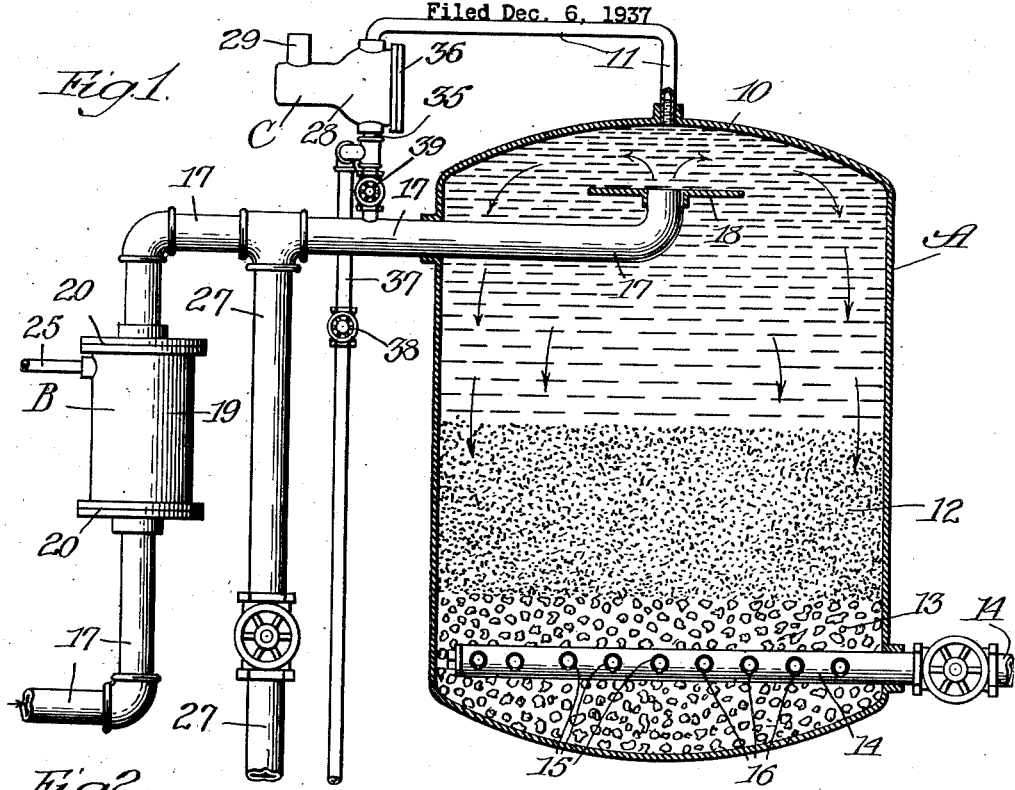
Figure 2:
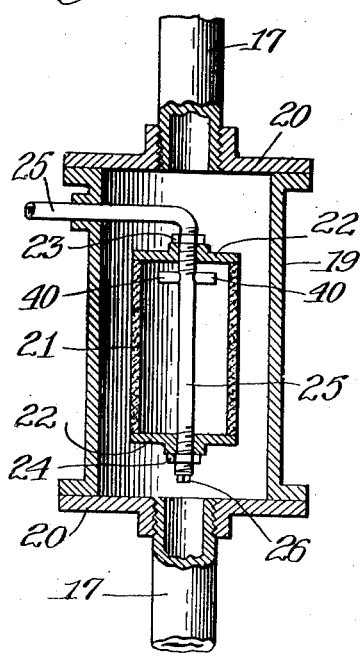
Figure 3:
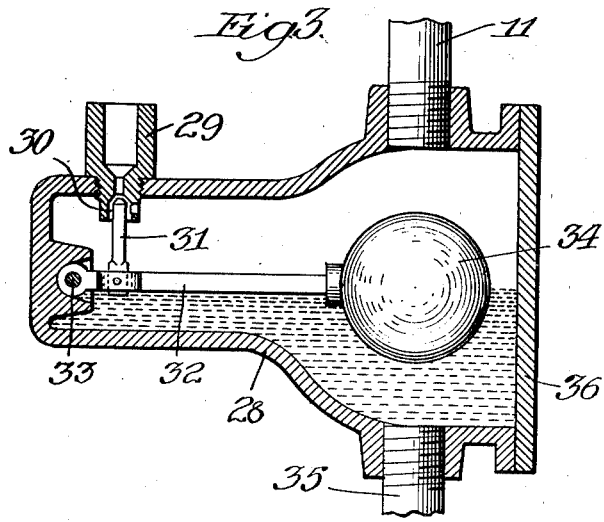

Figure 1 is a side elevational view of apparatus embodying our invention, the tank being shown in section; Fig. 2, a broken enlarged sectional view of the air diffusing means; and Fig. 3, a vertical sectional view of the air release mechanism.

In the illustration given, A designates the main tank; B, means for diffusing the air throughout the water stream; and C, automatic means for releasing the air.

The tank A may be of any suitable construction. We prefer to employ a tank having a dome-shaped top 10 to which is secured centrally a riser 11, the riser 11 having a horizontal section turned to communicate with the air release member C. In the lower portion of the tank are placed certain filtering materials, including a top layer 12 of sand and lower layers 13 of more coarsely formed filtering materials. A pipe 14 extends into the lower portion of the tank and is provided with outwardly extending pipes 15 having orifices 16 in their lower sides. By this means, water can be withdrawn from the lower portion of the tank and, when it is desired to reverse the flow in order to cleanse the filtering material, this means is employed for introducing water into the tank.

The fresh water inlet pipe 17 enters tank A near its top and is upwardly turned at its end and provided with a circular baffle plate 18. Between the baffle plate 18 and the sand layer 12 is a free board or surge space in which the sand may be moved and allowed to settle during the back washing operation.

The air diffusing apparatus B is located within the fresh water inlet pipe 17 outside tank A and may also be of any suitable construction. In the illustration given, the member B comprises an enlarged cylinder 19 closed at its ends by flanges 20, the flanges 20 being connected to the pipe 17. Within the chamber provided by cylinder 19 and flanges 20 is supported an air diffusing device consisting of a cylinder 21 having minute openings therethrough. Any cylinder affording extremely minute openings is suitable for the purpose. We have found a cylinder formed of material known as carborundum stone satisfactory. The ends of the cylinder 21 are closed by plates 22, and the plates 22 are confined against the ends of the cylinder so as to close the same by the engagement of nuts 23 and 24 with the threaded portions of the air inlet pipe 25, as shown more clearly in Fig. 2. The lower end of the pipe 25 is closed by a plug 26. Pipe 25 communicates with an air compressor (not shown). It is important that that portion of the inlet pipe 17 which extends above the diffuser B extend either in an upward direction or in a horizontal direction so as to avoid air locks and so as to feed the water and the air uniformly mixed therewith in a constant and even flow into the upper portion of tank A. A valved pipe 27 communicates with pipe 17, as shown more clearly in Fig. 1, and leads to a sump or sewer.

The air separating apparatus C is of well known construction and need not be described in detail. It consists of a casing 28 provided at its upper side with an outlet fitting 29 providing a valve seat 30. A valve stem 31 is carried by the float lever 32 pivotally secured at its free end to the casing 28 at 33 and having its other end provided with a water float 34. Air riser 11 communicates with the top of casing 28 and a riser 35 joins the lower portion of casing 28 and the inlet pipe 17. The casing 28 has an open end which is closed by plate 36. Communicating with pipe 35 at a point intermediate its junction with casing 28 and inlet pipe 17 is a pipe 37 leading to the sewer. Pipe 37 is provided with a hand-controlled valve 38. Pipe 35 is likewise provided with a valve 39 located as shown more clearly in Fig. 1.

Operation

In operation, fresh water from the pump is forced through inlet pipe 17 into the enlarged chamber provided by cylinder 19. Simultaneously compressed air is passed through pipe 25 into the diffuser 21, the air escaping through the fittings 40 into the upper portion of the chamber and thence escaping through the minute openings in the cylinder 21 to the enlarged chamber outside. By introducing the air into the upper portion of cylinder 21, the air does not tend to churn any liquid which might be within the cylinder to any great extent but passes rapidly through the walls of cylinder 21 into the stream of water outside. As the air passes out of the minute openings in finely divided form, it forms extremely minute bubbles which are constantly washed off the surface of cylinder 21 and carried by the rapidly moving stream of water upwardly, thus preventing the bubbles from coalescing and causing them to be uniformly distributed throughout the cross section of the liquid stream. This action results in bringing the oxygen of the air into the intimate contact with the soluble iron compounds in the stream and brings about an oxidation of such compounds, thus rendering them insoluble and thus removable by filtration. Simultaneously, the oxidation and aeration produce other desirable changes in compounds carried by the water so that they may be removed by filtration, the evolved gases being removable later with the air. The water stream thus charged uniformly with the great body of minute bubbles passes into the upper portion of tank A, the course being that of upward inclination or along a horizontal path. The stream discharges into tank A above baffle 18, as indicated by arrows in Fig 1.

Tank A is preferably kept charged with water, the level being maintained about midway of the air outlet mechanism 28 and the vertical portion of riser 11. It will be understood, however, that the level of the liquid may be dropped to a lower point while still carrying out the spirit of our invention. Inlet pipe 17, diffuser B, and tank A are preferably kept under super-atmospheric pressure in order to bring about prompt and effective oxidation of the iron compounds. Usually the pressure varies from 45 to 70 pounds, and the pressures sometimes exceed both of these limits. The usual pressure ranges between 50 to 60 pounds per square inch.

The water passing through the diffusing device B flows from the inlet pipe 17 into the tank A and into the riser 35 leading to the releasing means C. Since the tank A communicates with the releasing chamber C through the riser 11, the level of the water in the riser 11 and the chamber C will be substantially the same. As the operation is carried on, air passes through the riser 11 to the chamber C.

As the process continues, the air in the riser 11 and the chamber C increases in pressure and forces the water level and the float 34 downwardly. This lowers the valve stem 31 from the valve seat 30, permitting air to escape through the outlet 29. When the air is released, the pressure within the chamber C and the riser 11 is decreased and the water level rises, lifting the float 34 and closing the release valve. The process of releasing the air is thus automatic and self-controlling.

If the water level is allowed to remain well within tank A, so that a substantial body of air is enclosed in the space above the water level and the top of the tank at such pressures as are usually employed in the system, there is a substantial absorption by the water of certain constituents of the air, such as, for example, nitrogen, and such constituents remain in the water until it is later released from the faucet by the consumer. When the water is released, the nitrogen or other gases immediately forms a large number of small bubbles producing what is commonly known as "white water." This result is undesirable and various suggestions and plans have been evolved to avoid it, all of which, as far as our knowledge goes, have been unsuccessful.

We have discovered that by maintaining a small body of water above the main body and withdrawing the air from the small body, that this undesirable result can be avoided. The cross section of the small body of water being extremely limited, there is thus maintained above it a relatively small air surface so that the degree of absorption of nitrogen or other gases is proportionately reduced. With the new process described herein, the presence of white water where ordinary pressures, such as from 50 to 60 pounds, are employed, cannot be detected, assuming that the amount of free air introduced is properly controlled.

In the process described, the only surfaces wherein the water contacts the air body are those in riser 11 and in the member C. These surfaces are greatly less than those which would be encountered if the top portion of tank A were filled with air so that there is a correspondingly lower fractional absorption of the gases. In this same connection, it will be noted that evolved gases which may contain disagreeable odors, etc., are likewise maintained to a much greater degree out of contact with the main body of water and the absorption thereof is much decreased.

We have also discovered that another cause for white water is the introduction of too much air in proportion to the incoming stream of water. We have discovered that there is a definite relation between the formation of white water, the quantity of free air introduced per gallon of water, the existing pressure in the system, and the time of exposure of the air to the water.

In the case of a low pressure, such as 40 pounds, a larger volume of air, say approximately two cubic feet per 100 gallons of water, may be introduced into the pipe 17. In the case of very high pressure, such as 65 pounds, two cubic feet per 100 gallons of water is found to be excessive and it results in "white water." With the usual pressures of from 50 to 60 pounds, we find that the preferred quantity of air is approximately one cubic foot of free air to 100 gallons of water. Above 60 pounds pressure, an amount of air less than one cubic foot per 100 gallons of water should be introduced, the amount being reduced in accordance with the pressure. However, when the amount of free air drops much below one-half cubic foot, the oxidation is usually found to be unsatisfactory. On the other hand, when pressures are dropped below 40 pounds, we find that free air can be introduced in excess of two cubic feet per 100 gallons of water. From the foregoing, one skilled in the art can readily determine the proper amounts of free air which are to be introduced into the system per 100 gallons of water in order to avoid white water while at the same time producing effective oxidation.

As stated above, another important factor in addition to pressure is the length of time that the air remains in contact with the water, and this factor influences the foregoing conclusions. We prefer to withdraw the air as quickly as possible from the water. The farther the diffuser is located from the tank and the longer the conduit connecting the diffuser and the tank A, the greater the length of time that the air remains in contact with the water. We prefer to have the diffuser located adjacent the tank A with upwardly inclined or horizontal pipes so that the air will pass rapidly from the diffuser into tank A and thence escape. With this arrangement, we find that the air escapes in less than a minute. Under normal conditions, we find that it escapes in the neighborhood of ten seconds.

The water from tank A is withdrawn after the same has passed through the filtering layers through pipe 14 into the main lines for the city or into the storage tank. The iron compounds and other compounds which are rendered insoluble are thus removed in the filter layers. It will be noted that the entire filtration is carried on within tank A itself and is not accomplished in separate and additional apparatus known as "settling chambers, etc." as have heretofore been found necessary.

In cleansing the filtering layers, fresh water is forced through pipe 14 and upwardly through the filtering layers 12 and 13 and thence out through pipe 17 and thence through pipe 27 to the sewer, a valve (not shown) in pipe 17 being closed so as to prevent the water from passing through diffuser B. In this operation, the baffle 18 causes the water to pass uniformly through the filtering layers so as to remove the foreign materials from all parts thereof.

The apparatus shown is extremely simple but effective in carrying out the process described. It is sometimes found that the valve 31 in the air separator C becomes clogged with iron or other compounds. We find that such foreign matter can be readily removed by opening valve 38, valve 39 in pipe 35 being closed. This causes liquid to pass from tank A and through riser 11 downwardly upon float valve 34, thus depressing the same and opening the valve 31. The liquid then passes downwardly through pipe 37 and some of it escapes upwardly through the air outlet 29, effectively dislodging the foreign particles carried by the valve or valve seat.

While in the foregoing description, we have set forth certain examples and specific steps as preferred, it will be understood that these are illustrative only and that the same may be modified greatly without departing from the spirit of our invention.

The foregoing detailed description has been given for clearness of understanding only, and no unnecessary limitations should be understood therefrom, but the appended claims should be construed as broadly as permissible, in view of the prior art.

We claim:

1. In a process for the purposes set forth, the steps of maintaining a body of water in a restricted zone and under pressure of from 50 to 60 pounds, maintaining the level of water in said zone sufficiently high to prevent the exposure to air of any substantial portion of said body of water, passing fresh water in a confined stream into said body, introducing compressed air into said water in the proportion of approximately one cubic foot of free air to 100 gallons of water, the air being finely divided and forming minute bubbles in said water, removing said introduced air quickly from said body of water, and filtering and withdrawing water from said body.

2. In a process for the purposes set forth, the steps of maintaining a body of water in a restricted zone under pressures in excess of 60 pounds, said zone being substantially filled by said body of water whereby only a very small portion of the surface of said body of water may be exposed to air, passing a stream of fresh water into said body, introducing air under pressure into said stream in the proportion of not less than one-half cubic foot and not greater than one cubic foot of free air for each 100 gallons of water, the air being introduced in finely divided form so as to form minute bubbles in said stream, withdrawing the air quickly from the body, and filtering and withdrawing water from said body.

3. In a process for purifying water by removing iron therefrom, the steps of maintaining a body of water under pressure within a restricted zone wherein only a small portion of the surface of said body is exposed to air, maintaining a second much smaller body of water within a restricted zone and communicating with said first-mentioned body adjacent the top thereof, passing fresh water in a confined stream into said first-mentioned body, said stream being introduced into said body below the surface thereof, introducing air into said stream under pressure and in finely divided form to produce minute air bubbles throughout a cross section of said stream, withdrawing said air from said first-mentioned body to the zone of said smaller body, withdrawing air from the zone of said second-mentioned body of water, and filtering and withdrawing water from said first-mentioned body.

4. In a process for purifying water by removing iron therefrom, the steps of maintaining a main body of water under pressure within a restricted zone wherein only a small portion of the surface of said body is exposed to air, passing fresh water in a confined stream into said body, introducing air into said stream under pressure and in finely divided form to produce minute air bubbles throughout a cross section of said stream, maintaining a small body of water communicating through one passage with said confined stream and through another passage with said main body, withdrawing said air from said main body to a position above said small body, withdrawing air from said position above the small body of water, and filtering and withdrawing water from said main body.

5. In a process for purifying water by removing iron therefrom while preventing the absorption of large amounts of air by said water, the steps of maintaining a main body of water under pressures in excess of 40 pounds in a restricted zone wherein only a small portion of the surface of said body of water is exposed to air, rapidly passing fresh water in a confined stream and under pressures in excess of 40 pounds into said main body of water, introducing into said stream air under pressure and in an amount not in excess of 2 cubic feet of air for each 100 gallons of water, the air being in finely divided form and forming minute bubbles in said stream and being introduced into said stream at a point closely adjacent said main body, maintaining a much smaller body of water in communication with the top portion of said main body, the surface of said smaller body being exposed to air, withdrawing said air from said main body of water to a position above said smaller body of water, and withdrawing air from said position above the smaller body of water.

6. In a process for purifying water by removing iron therefrom, the steps of maintaining a tank filled with water under superatmospheric pressure, passing fresh water in a confined stream and under superatmospheric pressure into said tank, introducing air into said stream before it enters said tank, said air being introduced in finely divided form and under pressure to produce minute bubbles in said stream, providing an air outlet conduit of relatively small cross section area communicating with the top of said tank, with the water in said tank extending into said outlet conduit, maintaining the water in said outlet at a level above the top of said tank, withdrawing said introduced air through said air outlet, and filtering the water in said tank.

7. In a process for purifying water by removing iron therefrom, the steps of flowing water to be treated under superatmospheric pressure and in a confined stream while discharging air in finely divided form into said stream to produce minute bubbles therein, maintaining a main body of water in a restricted zone and under superatmospheric pressure, said zone being substantially filled by said body of water whereby only a small portion of the surface of said body of water may be exposed to air, passing said stream of water continuously into said body of water, removing said introduced air quickly from said body of water and out of contact with said body of water whereby the air is removed from said body of water without being substantially absorbed thereby, and filtering said body of water.

8. In a process for the purposes set forth, the steps of maintaining a body of water in a restricted zone under pressures in excess of 40 pounds, said zone being substantially filled by said body of water whereby only a very small portion of the surface of said body of water may be exposed to air, passing a stream of fresh water into said body, introducing into said stream air under pressure not in excess of two cubic feet of free air for each 100 gallons of water, the air being in finely divided form and forming minute bubbles in said stream, removing the air quickly from said body, and filtering and withdrawing water from said body.

9. In a process for purifying water by removing iron therefrom, the steps of maintaining a main body of water within a restricted zone and under superatmospheric pressure, said zone being substantially filled by said water whereby only a small portion of the surface of the main body of water is exposed to air, passing fresh water in a confined stream and under superatmospheric pressure into said main body of water, introducing air in finely divided form into said stream of water, providing a smaller body of water communicating with said main body but being much smaller than said main body, quickly withdrawing said introduced air from the main body of water to a position above the smaller body, and withdrawing said introduced air from said position above said smaller body of water.

10. In apparatus of the character set forth, a tank, filtering materials supported in the lower portion of said tank, means for withdrawing filtered water from the lower portion of the tank, a fresh water inlet pipe communicating with said tank for passing a stream of water thereinto, means in said inlet pipe adjacent said tank for introducing air in finely divided form into the stream of water in said inlet pipe, producing minute bubbles in said stream, an air outlet conduit of relatively small cross sectional area communicating with said tank and extending above the top of the same, means for maintaining water in said tank with the water extending into said outlet conduit, the level of the water in said outlet conduit being maintained above the top of said tank, and means for withdrawing said introduced air through said air outlet.

11. In a process for purifying water by removing iron therefrom, the steps of flowing water to be treated under superatmospheric pressure and in a confined stream while discharging air in finely divided form into said stream to produce minute bubbles therein, maintaining a main body of water in a restricted zone and under superatmospheric pressure, said zone being substantially filled by said body of water whereby only a small portion of the surface of said body of water may be exposed to air, passing said stream of water continuously into said body of water, removing said introduced air quickly from said body of water whereby the air is removed from said body of water without being substantially absorbed thereby, and filtering said body of water.

JOSEPH P. LAWLOR.
VINCENT M. ROACH.